United States Patent [19]

Fischer et al.

[11] 4,081,408
[45] Mar. 28, 1978

[54] CATALYST COMPOSITION

[75] Inventors: Ronald H. Fischer, Oakton, Va.; Julius Ciric, Pitman; Thaddeus E. Whyte, Jr., Cherry Hill, both of N.J.

[73] Assignee: Mobil Oil Corporation, New York, N.Y.

[21] Appl. No.: 742,151

[22] Filed: Nov. 15, 1976

Related U.S. Application Data

[60] Continuation-in-part of Ser. No. 615,458, Sep. 22, 1975, abandoned, which is a continuation-in-part of Ser. No. 518,671, Oct. 29, 1974, abandoned, which is a division of Ser. No. 455,442, Mar. 27, 1974, Pat. No. 3,867,282.

[51] Int. Cl.$^2$ .................... B01J 21/04; B01J 21/10; B01J 23/84
[52] U.S. Cl. .................... 252/465; 208/216
[58] Field of Search .................... 252/465

[56] References Cited

U.S. PATENT DOCUMENTS 2,992,191  7/1961  Erickson .................... 252/465 X

*Primary Examiner*—W. J. Shine
*Attorney, Agent, or Firm*—Charles A. Huggett; Dennis P. Santini

[57] ABSTRACT

A catalyst composition is provided which comprises a magnesium aluminate spinel having a surface area of greater than about 50 m$^2$/g, a total pore volume of greater than about 0.475 cc/g from about 50 to about 70 percent of the total pore volume in pores of diameter of from about 50 Angstroms to about 150 Angstroms, greater than about 30 percent of the total pore volume in pores of diameter of from about 80 Angstroms to about 150 Angstroms and from about 5 to about 20 percent of the total pore volume in pores of diameter of greater than 300 Angstroms, said magnesium aluminate spinel having deposited thereon from about 1 to about 5 weight percent cobalt oxide and from about 8 to about 20 weight percent molybdenum oxide.

4 Claims, No Drawings

CATALYST COMPOSITION

CROSS-REFERENCE TO RELATED APPLICATIONS

This application is a continuation-in-part of application Ser. No. 615,458, filed Sept. 22, 1975, now abandoned which was a continuation-in-part of application Ser. No. 518,671, filed Oct. 29, 1974, now abandoned, which was a division of application Ser. No. 455,442, filed Mar. 27, 1974, now U.S. Pat. No. 3,867,282.

BACKGROUND OF THE INVENTION

1. Field of the Invention

This invention relates to a new catalyst composition useful for demetalation and desulfurization of oil stock, e.g. residua. More particularly, it relates to a specific catalyst composition of cobalt-molybdenum deposited magnesium aluminate spinel useful in a process for residua demetalation and desulfurization, said process comprising contacting said residua with said catalyst of cobalt-molybdenum deposited magnesium aluminate spinel in the presence of hydrogen.

2. Description of the Prior Art

Residual petroleum oil fractions containing relatively high proportions of metals, such as those heavy fractions produced by atmospheric and vacuum crude distillation columns, would represent excellent charge stocks for a cracking process were it not for their high metals content. Principal metal contaminants are nickel and vanadium, with iron and copper also sometimes present. Additionally, trace amounts of zinc and sodium may be present. Since these metals, when present in crude oil, are associated with very large hydrocarbon molecules, the heavier fractions produced by crude distillation contain substantially all the metals present in the crude, such metals being particularly concentrated in the asphaltene residual fraction. The metal contaminants are typically large organometallic complexes such as metal porphyrins.

At present, cracking operations are performed on petroleum fractions lighter than residua fractions. Typical cracking charge stocks are coker and/or crude unit gas oil, vacuum tower overhead, etc., the feedstock having an API gravity range of between about 15 and about 45. Since these charge stocks are lighter than residual hydrocarbon fractions, such residual fractions being characterized as having an API gravity of less than about 25, they do not contain significant proportions of the heavy and large molecules in which the metals are concentrated.

When metals are present in a cracking unit charge stock, such metals are deposited on the cracking catalyst. The metals act as a catalyst poison and greatly decrease the efficiency of the cracking process by altering the catalyst so that it promotes increased hydrogen production.

Sulfur is also undesirable in a cracking unit charge stock. The sulfur contributes to corrosion of the unit's mechanical equipment and creates difficulties in treating products and flue gases. At typical cracking conversion rates, about one-half of the sulfur charge to such a unit is converted to $H_2S$ gas which must be removed from the gasoline product, usually by scrubbing with an amine stream. A large portion of the remaining sulfur is deposited on the cracking catalyst itself. When the catalyst is regenerated, at least a portion of this sulfur is oxidized to form $SO_2$ or $SO_3$ gas which must be removed from the flue gas which is normally discharged into the atmosphere.

In the past, high molecular weight, e.g. residual, stocks containing sulfur and metals have often been processed in a coker to effectively remove metals and also some of the sulfur. However, there are limits to the amount of metals and sulfur which can be tolerated in the product coke if it is to be marketable. Hence, there is a considerable need to develop economically practicable means for effecting the removal and recovery of metallic and sulfur contaminants from high boiling fractions of petroleum oils so that conversion of such contaminated oils to more desirable products may be effectively accomplished. The present application is particularly concerned with providing a catalyst for the removal of metal and sulfur contaminants from residual oil.

It has been proposed to improve the salability of high sulfur and metal content residual-containing petroleum oils by a variety of hydroprocessing methods, e.g. hydrodesulfurization and hydrodemetalation. However, difficulty has been experienced in achieving a commercially feasible catalytic hydroprocessing process. Short catalyst life in such processes is manifested by inability of a catalyst to maintain a relatively high capability for desulfurizing charge stock with increasing quantities of coke and/or metallic contaminants deposited thereon which act as catalyst poisons. Satisfactory catalyst life can be obtained relatively easily with distillate oils, but is especially difficult to obtain in desulfurizing residual oils, since the asphaltenic or porphyrinic components of an oil, which tend to form disproportionate amounts of coke, are concentrated in the residual fractions of a petroleum oil, and since a relatively high proportion of the metallic contaminants that normally tend to poison catalysts are commonly found in the asphaltene components of the oil. Further, on a commercial scale, these processes are rather costly due to high hydrogen consumption levels. It is, therefore, advantageous to provide a demetalation/desulfurization process catalyst such as the present invention which provides superior demetalation characteristics, good desulfurization benefits, low hydrogen consumption and satisfactory aging properties.

U.S. Pat. Nos. 3,716,479 and 3,772,185 propose demetalation of a hydrocarbon charge stock by contacting the charge stock with added hydrogen in the presence of a catalyst material derived from a manganese nodule.

U.S. Pat. No. 2,992,191 discloses broadly a calcined hydrodesulfurization catalyst consisting of a crystalline magnesium aluminate spinel which has associated therewith both cobalt and molybdenum. The critical parameters found by applicants to provide the improved catalyst material of the present invention are not taught or suggested by the patent specification.

British patent specification Nos. 1,318,941 and 1,318,942 disclose use of zinc, magnesium, beryllium or calcium aluminate spinels combined, after calcination, with a Group VIII metal, such as, for example, platinum, as a dehydrogenation catalyst.

Demetalation of hydrocarbon fractions is disclosed in U.S. Pat. No. 2,902,429 as contacting said fractions with a catalyst having a relatively small amount of a sulfur-resistant hydrogenation-dehydrogenation component disposed on a low surface area carrier, i.e. carrier with a surface area of not more than $15m^2/g$, and preferably not more than about $3m^2/g$. Examples of such low surface area carriers include diatomaceous earth, natural clays and Alundum.

There are numerous references in the art showing various metals combined with carriers such as alumina, silica, zirconia or titania as catalysts for use in demetalation and/or desulfurization processes. No references are known to the applicants which teach the present invention with its attendant benefits.

SUMMARY OF THE INVENTION

In accordance with the present invention, a porous solid material catalyst identified as a magnesium aluminate spinel having a relatively high surface area and pore volume and a special pore size distribution and having deposited thereon both cobalt oxide and molybdenum oxide is provided.

DESCRIPTION OF PREFERRED EMBODIMENTS

A catalyst composition is provided which comprises a magnesium aluminate spinel having a surface area of greater than about 50 m$^2$/g and up to about 300 m$^2$/g and higher, a total pore volume of greater than about 0.475 cc/g and up to about 1.3 cc/g and higher, from about 50 to about 70 percent of the total pore volume in pores of diameter of from about 50 Angstroms to about 150 Angstroms, greater than about 30 percent of the total pore value in pores of diameter of from about 80 Angstroms to about 150 Angstroms and from about 5 to about 20 percent of the total pore volume in pores of diameter of greater than 300 Angstroms, said magnesium aluminate spinel having deposited thereon from about 1 to about 5 weight percent cobalt oxide and from about 8 to about 20 weight percent molybdenum oxide.

The deposited cobalt and molybdenum are in the oxide form in the present catalyst composition. The preferred form is comprised of from about 1 to 5 weight percent cobalt oxide (CoO) and from about 8 to about 20 weight percent molybdenum oxide (MoO$_3$). A particularly preferred composition would have from about 2 to about 4 weight percent CoO and from about 10 to about 15 weight percent MoO$_3$.

These catalyst materials may be made according to procedures well known in the art (exemplified hereinafter) and may be, if desired, dehydrated, at least partially, before use. Such dehydration can be accomplished by heating to a temperature in the range of 200° C to 600° C in an inert atmosphere such as air or nitrogen and at an atmospheric or subatmospheric pressure for between 1 and 48 hours. Dehydration can also be performed at lower temperatures merely by placing the catalyst in a vacuum, but a longer time is required to obtain a like degree of dehydration under the latter conditions.

The catalyst composition of this invention exhibits substantial utility when used in a process to produce an upgraded, demetalized and desulfurized oil. Such a process may involve contacting an oil stock, e.g. residua, with hydrogen and with the present catalyst composition.

The oil stock which may be treated in accordance with the above process may generally be any residual oil comprising a total nickel and vanadium content of between about 1 ppm and about 300 ppm, or, more usually, between about 1 ppm and about 250 ppm. Said oil stock may also be found to be a high boiling range residual oil boiling above about 400° F. Such oil stock may include components obtained by, for example, fractionation, such as atmospheric or vacuum crude distillation, of crude oils. Non-limiting examples of said crude oils are Pennsylvania, Mid-continent, Gulf Coast, West Texas, Amal, Agha Jari, Kuwait, Barco, Arabian, Lago Media and others. Said oil stock may be one having a substantial portion thereof of the fractionation product of one or more of the above-mentioned crude oils mixed with other oil stocks.

It is further observed that the above process may be effectively conducted using crude oils as the oil stock when said crude oils comprise a total nickel and vanadium content of between about ½ ppm and about 75 ppm.

Operating parameters in the above process may be varied between certain defined limits. For example, when a flow process is utilized the liquid hourly space velocity (LHSV) may be maintained at from about 0.1 hr$^{-1}$ to about 2 hr$^{-1}$, with a preferred range of from about 0.25 hr$^{-1}$ to about 1 hr$^{-1}$. When a batch process is utilized, contact time should be maintained at from about 10 minutes to about 180 minutes, preferably from about 10 minutes to about 100 minutes. The temperature may be maintained within the range of from about 600° F to about 1000° F, with a preferred temperature range of from about 675° F to about 800° F. The pressure of the reaction system may be maintained between about 1000 psig and about 3000 psig, with a preferred pressure range being from about 1800 psig to about 3000 psig.

In order to more fully illustrate the catalyst composition of the present invention, the following specific examples, which in no sense limit the invention, are presented.

EXAMPLE 1

A quantity of the magnesium aluminate spinel of the present invention was prepared by the following method:

To a 2000 ml. flask purged with dry nitrogen and equipped with a condenser and septum was added 24.2 grams of magnesium metal and 1000 ml. of anhydrous methanol. The addition was at room temperature and the mixture was refluxed for 2 hours to yield a first solution.

To a 3-neck flask purged with dry nitrogen and equipped with a stirrer, check valve, thermometer and septum was added 408 grams of aluminum isopropoxide and 3000 ml. of 2-propanol. The dry nitrogen purge was stopped and the mixture in the flask was stirred and heated to 76° C until a hazy second solution appeared.

The flasks containing the first solution and the second solution were connected with plastic tubing and the condenser of the flask containing the first solution was replaced with a dry nitrogen line. Pressure was supplied to the flask containing the first solution via the dry nitrogen line and the first solution was transferred to the flask containing the second solution. Stirring was continued in the flask containing both solutions for a 5 hour reaction period. The flask was then cooled and the contents filtered to a cake and placed in a large pan lined with filter paper to hydrolyze the contents in air for about 3 days. The product was then calcined for 48 hours at 1200° F with a heat-up rate of 1° F per minute.

A 1345 gram quantity of the above product material was then mixed in a pan mixer for 15 minutes. To this material was added 1327 grams of water with mixing continued. The total mixture was then mulled for 1 hour. The mixture was then extruded to 1/32-inch pellets, dried overnight at 250° F and heated to 1200° F at 1° F per minute for 48 hours. It was then heated at 1400°

F for 10 hours. X-ray diffraction analysis of this product proved it to be a magnesium aluminate spinel.

To 225 grams of the above product material was added 224 ml. of solution containing 38.7 grams ammonium heptamolybdate (82.4% $MoO_3$). The product was then dried for 3 hours at 250° F. It was then contacted with 148 ml. solution containing 36.2 grams cobaltous chloride hexahydrate, dried at 250° F and calcined in a dish for 10 hours at 1000° F, with a heat-up rate of 2° F per minute.

Chemical and physical analysis of the final product of Example 1 proved it to have the following properties:

| | |
|---|---|
| Surface Area, $m^2/g$ | 169 |
| Total Pore Volume, cc/g | 0.68 |
| Particle Density, g/cc | 1.23 |
| CoO, wt. % | 3.1 |
| $MoO_3$, wt. % | 10.5 |
| MgO, wt. % | 22.6 |
| $Al_2O_3$, wt. % | 62.5 |

Pore size distribution analysis of the final product of Example 1 proved it to conform to the requirements of the present invention, as shown in Table I, hereinafter presented.

EXAMPLE 2

A quantity of another magnesium aluminate spinel, similar to that of the present invention but not adhering to all the required limitations relative to total pore volume and pore size distribution, was prepared according to the method taught in above-noted U.S. Pat. No. 2,992,191, as follows:

Sodium hydroxide (160 grams) and sodium aluminate (2165 grams containing 1600 grams $Na_2O.Al_2O_3$) were dissolved in water. The solution was diluted to 8 liters filtered and labeled Solution A.

A second solution (Solution B) was prepared by dissolving 1682 grams magnesium nitrate hexahydrate and 360 ml concentrated nitric acid (70% $HNO_3$) in water and diluting to 6580 ml.

The 6580 ml of solution B and a quantity of 6580 ml of Solution A were flowed simultaneously over a half hour period into 16 liters of water with stirring. The resultant material was adjusted to 8.0 pH by adding 339 ml of concentrated nitric acid.

The product was filtered, and the solids were washed six times by slurrying the cake in 30 liters water and filtering each time. The solids were then dried in an oven for 24 hours at 250° F and rewashed similarly six more times with 30 liters water each time. The filter cake was dried again for 24 hours at 250° F.

The dried product was broken up and sieved through a 60 mesh screen. A total of 1045 grams of this product were mixed with 450 ml water and extruded with an auger extruder to 1/25 inch diameter. It was dried at 250° F for 21 hours and calcined for 6 hours at 1200° F. X-ray diffraction analysis of this product proved it to be a magnesium aluminate spinel.

To 100 grams of the above product material was added 57 ml of solution containing 17.2 grams ammonium heptamolybdate. The product was dried for 3 hours at 250° F. It was then contacted with 51 ml of solution containing 16.1 grams of cobaltous nitrate hexahydrate, dried at 250° F and calcined in a dish for 10 hours at 1000° F, with a heat up rate of 2° F per minute.

Chemical and physical analysis of the final product of Example 2 proved it to have the following properties:

| | |
|---|---|
| Surface Area, $m^2/g$ | 143 |
| Total Pore Volume, cc/g | 0.456 |
| Particle Density, g/cc | 1.39 |
| CoO, wt. % | 3.1 |
| $MoO_3$, wt. % | 10.5 |

Pore size distribution analysis of the final product of Example 2 proved it not to conform to the requirements of the present invention, as shown in Table I, hereinafter presented.

TABLE I

| Catalyst of Example | 1 | 2 |
|---|---|---|
| Pore Volume (cc/g) in Pores of X Angstrom Diameter: | | |
| X | | |
| <30 | 0.049 | 0.054 |
| 30–50 | 0.015 | 0.063 |
| 50–80 | 0.113 | 0.070 |
| 80–100 | 0.094 | 0.033 |
| 100–150 | 0.139 | 0.092 |
| 150–200 | 0.070 | 0.056 |
| 200–300 | 0.080 | 0.015 |
| >300 | 0.120 | 0.073 |
| Percent of Total Pore Volume in Pores of Diameter of from 50 Angstroms to 150 Angstroms: | | |
| | 50.88 | 42.80 |
| Percent of Total Pore Volume in Pores of Diameter of from 80 Angstroms to 150 Angstroms: | | |
| | 34.26 | 27.4 |
| Percent of Total Pore Volume in Pores of Diameter of Greater than 300 Angstroms: | | |
| | 17.64 | 16.0 |

The magnesium aluminate spinel catalyst compositions prepared according to the above Examples were tested in a Shaker Bomb test under severe hydroprocessing conditions. In these tests, a batch-type reaction vessel was filled with 15 grams of catalyst material, 300 grams of residual oil (Lago Media atmospheric resid which had a sulfur content of 2.124 weight percent and a vanadium content of 235 ppm) and hydrogen and brought quickly to 750° F and 2000 psig while being agitated at 200 rpm. Contact time was 80 minutes. The Shaker Bomb apparatus used for these tests is fully described by J. W. Payne et al. in *Industrial and Engineering Chemistry*, volume 50, 1958, page 47. The test results are summarized in Table II, hereinafter presented.

It is readily observed from the data presented in Table II that the catalyst composition of the present invention, i.e. the catalyst composition of Example 1, provides significantly better demetalation and desulfurization than the other similar catalyst composition which does not have all of the same specific characteristics, i.e. the catalyst composition of Example 2.

TABLE II

| SHAKER BOMB TEST RESULTS | | |
|---|---|---|
| Catalyst of Example | 1 | 2 |
| Sulfur Removal, wt. % | 32.5 | 28.8 |
| Vanadium Removal, wt. % | 66.4 | 48.5 |

What is claimed is:

1. A catalyst composition which comprises a magnesium aluminate spinel having a surface area of greater than about 50 $m^2/g$, a total pore volume of greater than about 0.475 cc/g, from about 50 to about 70 percent of the total pore volume in pores of diameter of from about 50 Angstroms to about 150 Angstroms, greater than about 30 percent of the total pore volume in pores of diameter of from about 80 Angstroms to about 150 Angstroms and from about 5 to about 20 percent of the total pore volume in pores of diameter of greater than 300 Angstroms, said magnesium aluminate spinel having deposited thereon from about 1 to about 5 weight percent cobalt oxide and from about 8 to about 20 weight percent molybdenum oxide.

2. The catalyst composition of claim 1 wherein said magnesium aluminate spinel has deposited thereon from about 2 to about 4 weight percent cobalt oxide and from about 10 to about 15 weight percent molybdenum oxide.

3. The catalyst composition of claim 1 wherein said surface area is from greater than about 50 m$^2$/g to about 300 m$^2$/g and said total pore volume is from greater than about 0.475 cc/g to about 1.3 cc/g.

4. The catalyst composition of claim 2 wherein said surface area is from greater than about 50 m$^2$/g to about 300 m$^2$/g and said total pore volume is from greater than about 0.475 cc/g to about 1.3 cc/g.

* * * * *